US008651940B2

(12) United States Patent
Loat et al.

(10) Patent No.: US 8,651,940 B2
(45) Date of Patent: Feb. 18, 2014

(54) GAMING MACHINE WITH MATRIX OF REELS AND SPECIAL SYMBOL FEATURES

(75) Inventors: Eric M. Loat, Moncton (CA); Francois R. Leger, Dieppe (CA); Wesley S. Davis, Notre Dame (CA)

(73) Assignee: Spielo International Canada ULC, Moncton, New Brunswick (CA)

( * ) Notice: Subject to any disclaimer, the term of this patent is extended or adjusted under 35 U.S.C. 154(b) by 894 days.

(21) Appl. No.: 12/630,801

(22) Filed: Dec. 3, 2009

(65) Prior Publication Data

US 2011/0136562 A1 Jun. 9, 2011

(51) Int. Cl.
*A63F 13/00* (2006.01)
*A63F 9/24* (2006.01)
*G07F 17/32* (2006.01)
*G07F 17/34* (2006.01)

(52) U.S. Cl.
CPC .............. *G07F 17/32* (2013.01); *G07F 17/326* (2013.01); *G07F 17/3267* (2013.01); *G07F 17/3265* (2013.01); *G07F 17/3262* (2013.01); *G07F 17/34* (2013.01)
USPC ............................................... 463/20; 463/16

(58) Field of Classification Search
CPC ... G07F 17/32; G07F 17/326; G07F 17/3262; G07F 17/3265; G07F 17/3267; G07F 17/34
USPC ...................................................... 463/20, 16
See application file for complete search history.

(56) References Cited

U.S. PATENT DOCUMENTS 4,874,173 A * 10/1989 Kishishita ................. 273/143 R
5,393,061 A * 2/1995 Manship et al. ................ 463/20
5,584,764 A * 12/1996 Inoue .............................. 463/20
5,609,524 A * 3/1997 Inoue .............................. 463/20
5,697,843 A * 12/1997 Manship et al. ................ 463/20
5,704,835 A * 1/1998 Dietz, II .......................... 463/20
6,089,977 A * 7/2000 Bennett ........................... 463/20
6,093,102 A * 7/2000 Bennett ........................... 463/20
6,241,607 B1 * 6/2001 Payne et al. ...................... 463/20
6,251,013 B1 * 6/2001 Bennett ........................... 463/13
6,413,162 B1 * 7/2002 Baerlocher et al. ............. 463/20
6,439,993 B1 * 8/2002 O'Halloran ...................... 463/16
6,551,187 B1 * 4/2003 Jaffe ............................... 463/20
6,585,264 B2 * 7/2003 Benett ....................... 273/143 R
6,604,740 B1 * 8/2003 Singer et al. .................. 273/292
6,641,477 B1 * 11/2003 Dietz, II .......................... 463/20
6,676,511 B2 * 1/2004 Payne et al. ...................... 463/20
6,682,073 B2 * 1/2004 Bryant et al. ............. 273/138.1
6,805,632 B2 * 10/2004 Suda ............................... 463/25
6,921,335 B2 * 7/2005 Rodgers et al. ................. 463/30
6,997,808 B2 * 2/2006 Rodgers et al. ................. 463/30

(Continued)

*Primary Examiner* — William H McCulloch, Jr.

(74) *Attorney, Agent, or Firm* — Patent Law Group LLP; Brian D Ogonowsky

(57) ABSTRACT

A video slot machine has an array of individual symbol reels, such as a grid of 4×5 reels. The symbols include conventional symbols and special symbols. In the examples, the special symbols are wild symbols. Each wild symbol is associated with a particular direction, such as a vertical direction, a horizontal direction, or both. After an initial spin, an award for symbol combinations is paid out. If a wild symbol appears in the array, all reels along the designated direction are respun to give the player another chance at winning. Awards are paid again for new winning symbol combinations. If new wild symbols appear, another respin is performed along the direction(s) designated by the new wild symbols. The designated direction associated with a wild symbol may change for each game.

22 Claims, 4 Drawing Sheets

(56) References Cited

U.S. PATENT DOCUMENTS

| | | | | |
|---|---|---|---|---|
| 7,001,274 | B2 * | 2/2006 | Baerlocher et al. | 463/20 |
| 7,070,502 | B1 * | 7/2006 | Bussick et al. | 463/20 |
| 7,237,775 | B2 * | 7/2007 | Thomas et al. | 273/143 R |
| 7,252,589 | B1 * | 8/2007 | Marks et al. | 463/16 |
| 7,252,592 | B2 * | 8/2007 | Rodgers et al. | 463/30 |
| 7,275,989 | B2 * | 10/2007 | Moody | 463/20 |
| 7,309,281 | B2 * | 12/2007 | Baerlocher et al. | 463/20 |
| 7,309,282 | B2 * | 12/2007 | Baerlocher et al. | 463/20 |
| 7,326,113 | B2 * | 2/2008 | Bennett et al. | 463/25 |
| 7,445,548 | B1 * | 11/2008 | Muskin | 463/20 |
| 7,513,826 | B2 * | 4/2009 | Cuddy | 463/20 |
| 7,553,231 | B2 * | 6/2009 | Rodgers et al. | 463/20 |
| 7,704,141 | B1 * | 4/2010 | Marks et al. | 463/20 |
| 7,758,414 | B1 * | 7/2010 | Marks et al. | 463/20 |
| 8,012,011 | B2 * | 9/2011 | Baerlocher et al. | 463/20 |
| 8,172,665 | B2 * | 5/2012 | Hoffman et al. | 463/20 |
| 8,226,468 | B2 * | 7/2012 | Hoffman et al. | 463/20 |
| 8,231,452 | B2 * | 7/2012 | Suda et al. | 463/20 |
| 8,241,107 | B2 * | 8/2012 | Moroney | 463/20 |
| 8,277,307 | B2 * | 10/2012 | Jensen et al. | 463/20 |
| 8,277,308 | B2 * | 10/2012 | Baerlocher et al. | 463/21 |
| 8,562,416 | B2 * | 10/2013 | Baerlocher et al. | 463/20 |
| 2001/0036856 | A1 * | 11/2001 | Payne et al. | 463/20 |
| 2002/0025849 | A1 * | 2/2002 | Olive | 463/29 |
| 2002/0052233 | A1 * | 5/2002 | Gauselmann | 463/20 |
| 2003/0013517 | A1 * | 1/2003 | Bennett et al. | 463/25 |
| 2003/0064779 | A1 * | 4/2003 | Suda | 463/20 |
| 2003/0064802 | A1 * | 4/2003 | Rodgers et al. | 463/30 |
| 2003/0087690 | A1 * | 5/2003 | Loose et al. | 463/20 |
| 2003/0203752 | A1 * | 10/2003 | Kaminkow et al. | 463/20 |
| 2003/0203753 | A1 * | 10/2003 | Muir et al. | 463/20 |
| 2004/0014518 | A1 * | 1/2004 | Iwamoto | 463/20 |
| 2004/0033827 | A1 * | 2/2004 | Gilmore et al. | 463/20 |
| 2004/0127280 | A1 * | 7/2004 | Moody | 463/20 |
| 2005/0130737 | A1 * | 6/2005 | Englman et al. | 463/25 |
| 2005/0143165 | A1 * | 6/2005 | Berman et al. | 463/20 |
| 2005/0148384 | A1 * | 7/2005 | Marks et al. | 463/20 |
| 2006/0030392 | A1 * | 2/2006 | Rodgers et al. | 463/16 |
| 2006/0135247 | A1 * | 6/2006 | Baerlocher et al. | 463/20 |
| 2007/0021175 | A1 * | 1/2007 | Rodgers et al. | 463/16 |
| 2007/0254735 | A1 * | 11/2007 | Marks et al. | 463/20 |
| 2008/0090636 | A1 * | 4/2008 | Lathrop | 463/20 |
| 2008/0287178 | A1 * | 11/2008 | Berman et al. | 463/20 |
| 2009/0215518 | A1 * | 8/2009 | Yoshizawa | 463/20 |
| 2009/0227351 | A1 * | 9/2009 | Yoshizawa | 463/20 |
| 2009/0325678 | A1 * | 12/2009 | Gomez | 463/20 |
| 2010/0062827 | A1 * | 3/2010 | Hoffman et al. | 463/20 |
| 2010/0124972 | A1 * | 5/2010 | Rodgers et al. | 463/20 |
| 2010/0273550 | A1 * | 10/2010 | Marks et al. | 463/20 |
| 2010/0298041 | A1 * | 11/2010 | Berman et al. | 463/20 |
| 2011/0003629 | A1 * | 1/2011 | Englman et al. | 463/20 |
| 2011/0028202 | A1 * | 2/2011 | Naicker et al. | 463/20 |
| 2011/0034234 | A1 * | 2/2011 | Berman et al. | 463/20 |
| 2011/0111823 | A1 * | 5/2011 | Leger et al. | 463/20 |
| 2011/0136562 | A1 * | 6/2011 | Loat et al. | 463/20 |
| 2012/0315976 | A1 * | 12/2012 | Singer et al. | 463/20 |
| 2013/0184058 | A1 * | 7/2013 | Bennett et al. | 463/21 |

* cited by examiner

GAMING MACHINE WITH MATRIX OF REELS AND SPECIAL SYMBOL FEATURES

FIELD OF THE INVENTION

This invention relates to gaming devices, such as video slot machines, and, in particular, to a special game feature in a video slot machine displaying individual symbol reels.

BACKGROUND

Common video slot machines randomly select and display an array of symbols using virtual reels, then grant an award to a player based on the occurrence of certain symbol combinations across paylines. All symbols in a column are located on a single reel. Such reels limit the possibilities of game features, since the symbols in a column all move together.

Video slot machines are known that display a matrix of reels, where each reel ultimately only displays one symbol. One such machine is described in U.S. Pat. No. 5,393,061, incorporated herein by reference. These types of machines have generally just been used to play the same basic game as a standard video slot machine with the large vertical reels.

Typically, the game ends after a single spin of the reels and any award is granted. Although these types of basic games are highly successful, it is advantageous to provide special features that occur once in a while to make the game more interesting to a player. A more interesting game will generate increased revenue to the casino by increased play of the gaming machine.

SUMMARY

The present invention may be implemented by a conventional-platform video slot machine that is suitably programmed. The invention can also be implemented by a home computer playing a slot machine type game, or by an internet game, or by a personal device connected to a wireless network.

Various embodiments of the game are described. In one embodiment, a 4×5 matrix of reels (20 reels) is displayed on a video screen. Other size arrays may also be used. Each stopped reel displays a single symbol. During the base game, some or all of the reels include a special symbol, such as a wild symbol, where the special symbol is associated with a particular direction, such as a vertical or horizontal direction. In the example below, it is assumed the direction associated with the special symbols in the base game is initially vertical and that the special symbols are wild symbols.

After all the virtual reels have been spun and randomly stopped at the end of a base game, there will be a 4×5 array of randomly selected symbols. The player is then paid for any winning combinations of symbols in accordance with a paytable. Any wild symbol is considered to be all symbols for purposes of creating a winning combination. In one embodiment, all of the wild symbols also include a vertical arrow.

After the initial award is paid, all wild symbols are held in place and all other reels in the same column (i.e., along the vertical direction) as a wild symbol are respun, while all the other reels are held in place. When the respun reels have stopped, another award is paid for all new winning symbol combinations created by the respin, including new combinations created with any wild symbol. If any new wild symbols appear due to the respin, those new wild symbols are associated with only a horizontal direction. The new wild symbols are then held, and all reels in the rows containing the new wild symbols are respun. However, all old and new wild symbols are held. When the respun reels have stopped, another award is paid for all new winning symbol combinations created by the respin. This process is repeated until no new wild symbols have appeared after a respin. The direction of the new wild symbols alternate between vertical and horizontal to enable the possibility of all reels being respun. Therefore, the reel strips are changed after each respin.

In an alternative embodiment, awards are not evaluated and paid until after all of the respins have occurred.

In another embodiment, the directions associated with the wild symbols are not predetermined from game to game but are pseudo-randomly selected. In another embodiment, the direction associated with each wild symbol on a reel does not change from game to game.

In another embodiment, each wild symbol indicates only a single direction including up vertical, down vertical, left horizontal, and right horizontal, and only those reels along the indicated direction are respun.

In another embodiment, the special symbols that cause other reels to be respun are not wild symbols but are another high value symbol or any other symbol.

In one embodiment, there are also bonus symbols, where three or more displayed bonus symbols after a spin initiates a free game round, such as ten free games. The number of bonus symbols that appear determines a multiplier for awards during the free games. For the respins during the base game (the paid games), any displayed bonus symbol may be held, rather than respun, to give the player a better chance at obtaining three or more bonus symbols.

During the free games, each wild symbol may be enhanced, such as by being associated with both vertical and horizontal directions so that reels in the column and row of a newly displayed wild symbol are respun after a free game. Therefore, the player will typically have a better chance of obtaining additional wild symbols and winning combinations during the free games, making the free games more exciting. The respin process continues for a free game until no more new wild symbols are displayed after a respin.

The above described features would not be possible using large vertical reels where each reel displays all symbols in a single column.

Other embodiments are described.

BRIEF DESCRIPTION OF THE DRAWINGS

Elements that are the same or similar are designated with the same numeral in the various figures.

DETAILED DESCRIPTION

Although the invention can typically be implemented by installing a software program in most types of modern video gaming machines, one particular gaming machine platform will be described in detail.

Figure 1:
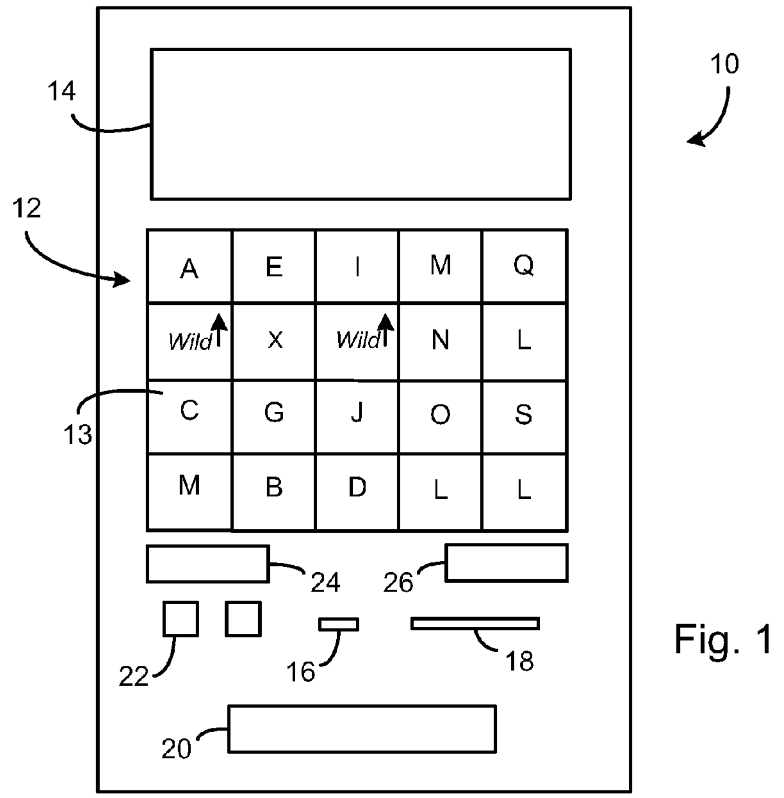
FIG. 1 illustrates a gaming machine that displays a game in accordance with one embodiment of the present invention.

FIG. 1 illustrates a video gaming machine 10 that incorporates the present invention. The machine 10 includes a bottom display 12 that may be a thin film transistor (TFT) display, a liquid crystal display (LCD), a cathode ray tube (CRT), or any other type of display. In FIG. 1, the base game shown in display 12 is a 4×5 matrix of virtual symbol reels 13, where each reel 13 displays only one full symbol. An award is granted based on symbol combinations across activated paylines, such as vertical, horizontal, and zig-zag paylines. In one embodiment, bets above the minimum bet activate additional paylines. Also, bets above the minimum may be used to increase the payout for each winning combination. In another embodiment, all paylines are activated with a single bet, and the awards are multiplied proportional to the amount bet. In one embodiment, there are a maximum of 50 paylines. The base game can involve any size array of reels. A minimum size should be a 3×3 array.

A top display 14 is also a video screen that may be used to display aspects of the game.

A coin slot 16 accepts coins or tokens in one or more denominations to generate credits within the machine 10 for playing games. An input slot 18 accepts various denominations of banknotes or machine-readable tickets, and may output printed tickets for use in cashless gaming. A coin tray 20 receives coins or tokens from a hopper upon a win or upon the player cashing out. Player control buttons 22 include any buttons needed for the play of the games offered by the machine 10 including, for example, a bet button, a max-bet button, a spin reels button, a cash-out button, and any other suitable button. Pressing the bet button multiple times multiplies the bet. Buttons 22 may be replaced by a touch screen with virtual buttons.

Each bet deducts credits from a credit meter 24 that stores the accumulated credits from wins and the insertion of money. If the player cashes out, all the credits in the credit meter 24 are paid to the player. A game win meter 26 identifies the amount won for the present game.

Figure 2:
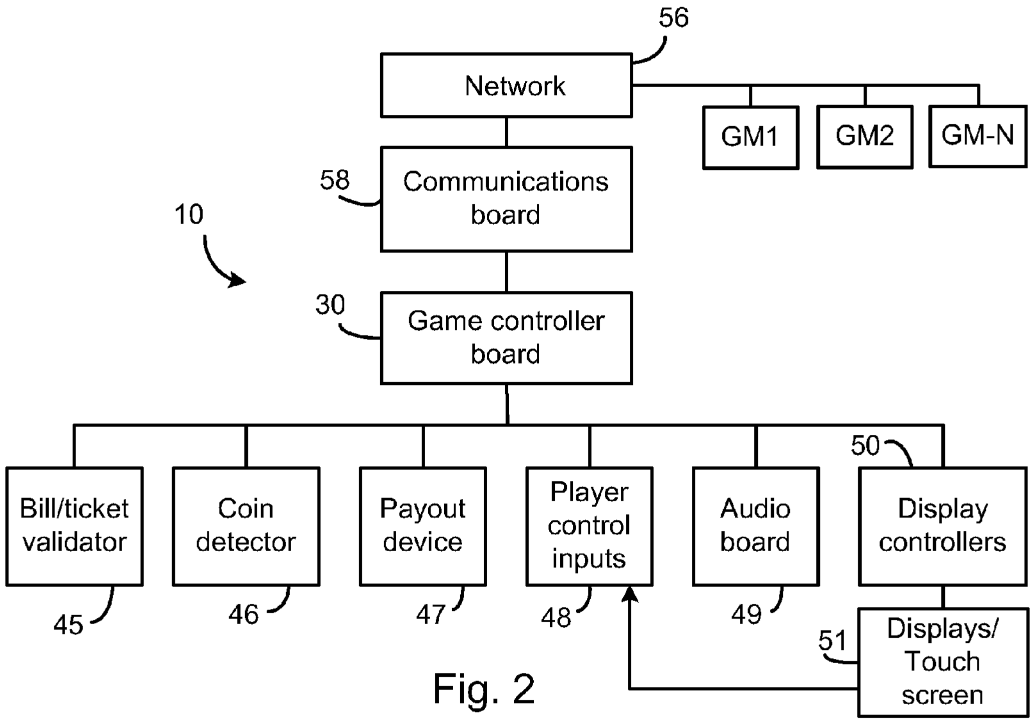
FIG. 2 is a block diagram of key components in the gaming machine of FIG. 1.

FIG. 2 illustrates basic circuit blocks in the machine 10 of FIG. 1 and portions of a network. A game controller board 30 includes a processor (CPU) that runs the gaming program (including any or all aspects of the game) stored in a program ROM, such as a CD. The program ROM may include a pseudo-random number generator program for selecting symbols and for making any other random selections. At least the active portion of the program is stored in a RAM on the board 30 for access by the processor. A paytable ROM on the board 30 detects the outcome of the game and identifies awards to be paid to the player. The paytable ROM may also identify a multiplier associated with various outcomes achieved during the bonus games. A bill/ticket validator 45 and coin detector 46 add credits for playing games. A payout device 47 pays out an award to the player in the form of coins or a printed ticket at the end of a game or upon the player cashing out. Player control inputs 48 receive push-button or touch screen inputs for making player selections. An audio board 49 sends signals to the speakers. A display controller 50 receives commands from the processor or network and generates signals for the various displays 51.

Modern gaming machines are connected within a network for remote monitoring of the machines. The game controller board 30 transmits and receives signals to and from a network 56 via a communications board 58. The network 56 includes servers and other devices that monitor the linked gaming machines 10 and GM1-GM-N.

In the below scenario, a software program for playing the base game and bonus game is installed in the gaming machine 10.

The below description of the game refers to steps in the flowchart of FIG. 7 and to certain screen displays shown in FIGS. 3A-5B.

Figure 3A:
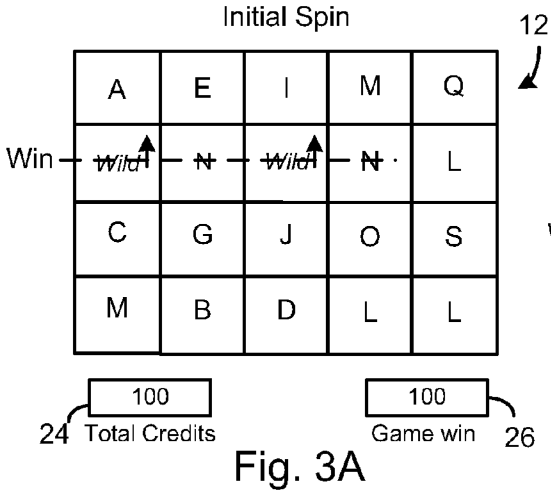
FIG. 3A illustrates the screen display on the gaming machine of FIG. 1 after an initial spin of the reels, where the symbol array includes directional wild symbols.
Figure 7:
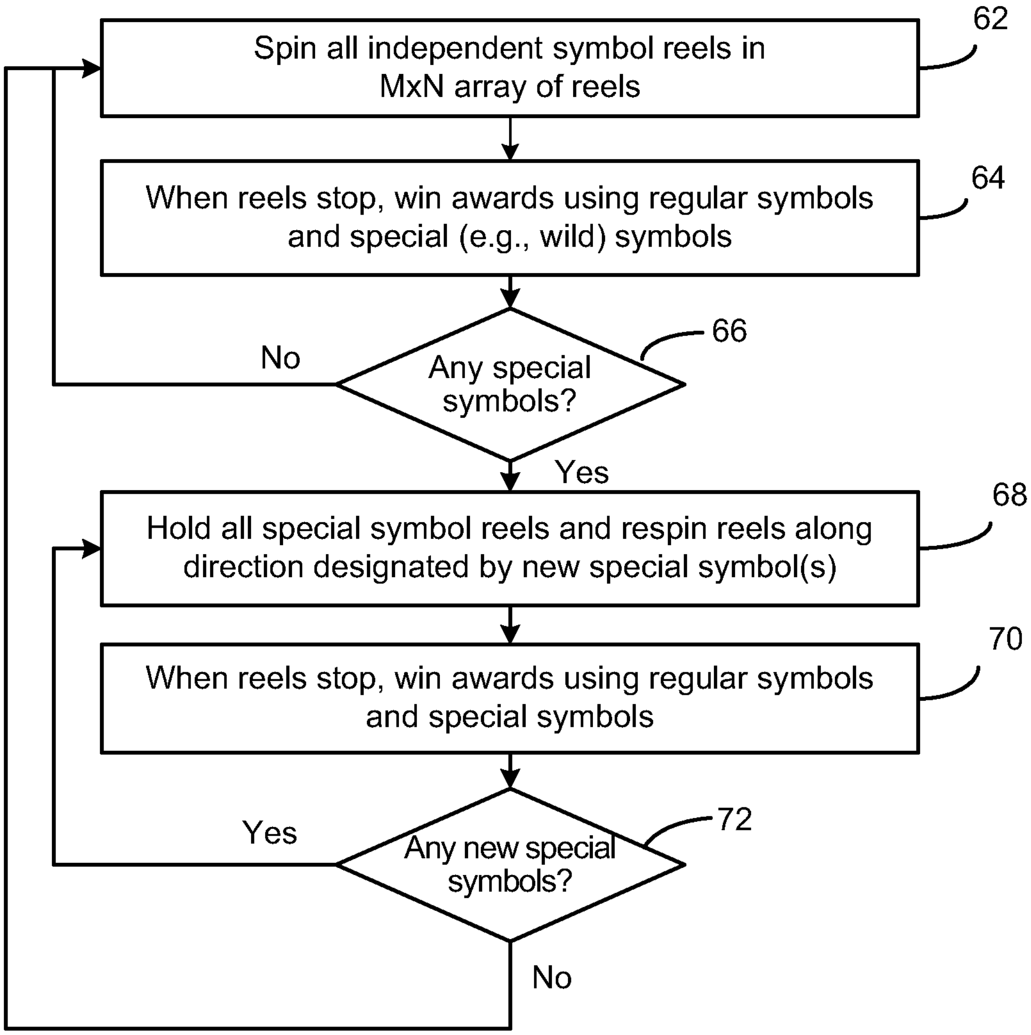
FIG. 7 is a flowchart identifying various steps taken in carrying out the game, in accordance with one embodiment of the invention.

In step 62 of FIG. 7, the player of the gaming machine 10 enters a bet amount for playing the base game on the machine 10, and all the reels 13 (20 reels) spin and randomly stop. FIG. 3A illustrates an example of the resulting array of symbols. In the examples, the "special symbols" are wild symbols.

In step 64 of FIG. 7, any winning symbol combination on any one of the activated paylines will pay an award. A wild symbol can be combined with any other symbol to create winning combinations. In the example of FIG. 3A, two wild symbols are displayed, and the player has achieved a winning combination of four Ns, awarding 100 credits. In one embodiment, only consecutive symbols starting from the leftmost reel can create a winning symbol combination. The credits from a present winning game are identified in the game win meter 26, which may be an area of the display 12. The total credits are shown in the credit meter 24, which may be an area of the display 12.

The two wild symbols in FIG. 3A are associated with a vertical direction. In one embodiment, during an initial spin, the wild symbols are only associated with a vertical direction. In another embodiment, the wild symbols may be associated with a horizontal direction or a combination of vertical and horizontal directions.

In step 66 of FIG. 7, it is determined whether there are any special (e.g., wild) symbols in the array. If not, the game ends.

If there are wild symbols, as shown in FIG. 3A and identified in step 68, the wild symbol reels are held, and the reels in the same column as the wild symbols (dictated by the vertical arrow next to the wild symbols) are respun. All other reels are held. The arrows next to the wild symbols may designate any direction identifying which reels are to be respun.

Figure 3B:
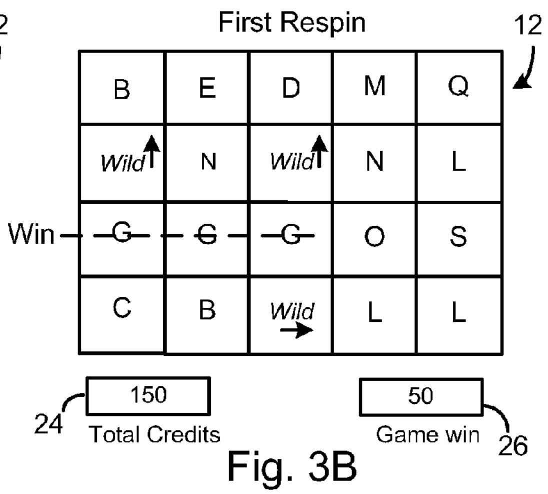
FIG. 3B illustrates the screen display after a first respin of the reels along the vertical direction associated with the wild symbols in FIG. 3A.

FIG. 3B illustrates the resulting display after the first respin of reels in the first and third columns of reels. In step 70 of FIG. 7, any awards for new winning symbol combinations are paid. In the example of FIG. 3B, the player achieved a 50 credit award for three Gs. The respin of the reels in the third column also resulted in the new display of a wild symbol at the bottom of the column. In the example, for the first respin, any wild symbol is associated with a horizontal direction. Therefore, the reel strips have been changed for the first respin.

Figure 3C:
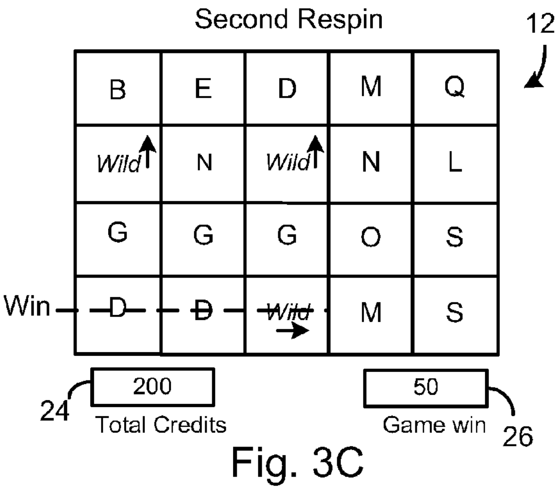
FIG. 3C illustrates the screen display after a second respin of the reels along the horizontal direction associated with the new wild symbols after the first respin.

In step 72, it is determined whether there are any new special (e.g., wild) symbols, which is the case in the example. Therefore, all wild symbols, old and new, are held, and the reels designated by the direction of the new wild symbol are respun. In this case, only the reels along the bottom row are respun, as shown in FIG. 3C. The player is awarded 50 credits for the three Ds, and the game ends since there are no new wild symbols after the second respin.

There may be any number of respins depending on whether new wild symbols are displayed after a respin. In this way, there is a potential for high rewards using the feature.

In another embodiment, awards are not determined until all respins have occurred. Or, initial awards for the first spin are paid, then additional awards are only paid after all respins have occurred, and the additional awards are based only on the final screen display. This allows the player to win awards for initial winning symbol combinations, even if the initial winning symbol combinations are subsequently broken up due to a respin.

Figure 4A:
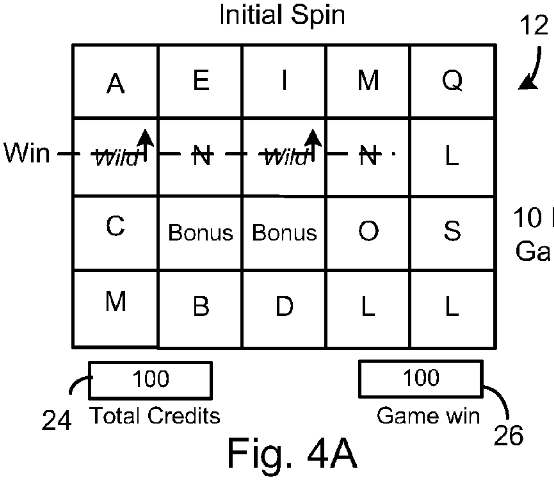
FIG. 4A illustrates the screen display after an initial spin of the reels, where the symbol array includes directional wild symbols reels and bonus symbols, and where three or more bonus symbols award a free game bonus round.
Figure 4B:
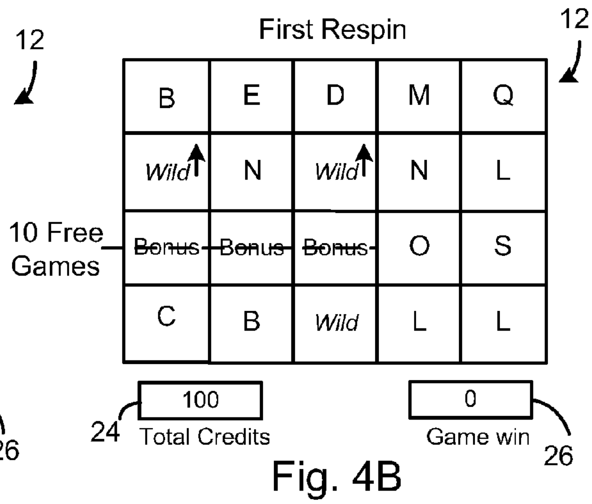
FIG. 4B illustrates the screen display after a first respin of certain reels, pursuant to the wild symbols in FIG. 4A, illustrating that the bonus symbols are held during the respin.

FIGS. 4A and 4B illustrate the application of the wild symbols when there are special bonus symbols that initiate a bonus round when three or more bonus symbols appear in the array. In FIGS. 4A and 4B, any bonus symbol is held during the respin, even if it is along the direction associated with a wild symbol. This increases the likelihood that a player will obtain at least three bonus symbols for initiating a free game bonus round (e.g., 10 free games).

In an alternative embodiment, the special bonus symbols are not held but are respun when they are in the direction associated with a wild symbol. In this case, the number of bonus symbols are counted and the tally of the number of bonus symbols which appear during the initial spin and respins is used to determine the bonus event (e.g., three bonus symbols=10 free games; four bonus symbols=10 free games at 2× mulitplier; ten bonus symbols=15 free games at 10× multiplier).

In FIG. 4A, the player received two bonus symbols and two wild symbols in an initial spin of the base game. A bonus symbol and wild symbol are both on the middle reel. The player is paid an award for the four Ns along the second row. Due to the existence of the wild symbols, the reels along the first and third columns are respun, with the wild symbols and the bonus symbol held. The result of the respin is shown in FIG. 4B. In the example, the respin of the reels in the first column resulted in another bonus symbol, so the player wins 10 free games. In one embodiment, the displaying of more than three bonus symbols causes any award during the free games to be multiplied. For example, four bonus symbols=2×; ten bonus symbols=10×, etc. The bonus symbols are scatter symbols so do not have to occur on the same payline.

Figure 5A:
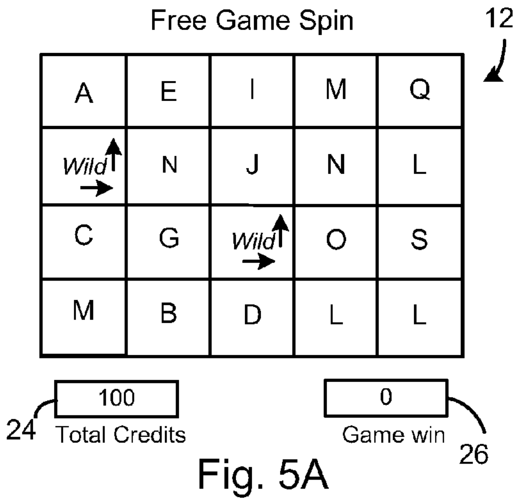
FIG. 5A illustrates the screen display after an initial spin during the free game bonus round, where the directional wild symbols are enhanced, such as by causing respins of reels along both vertical and horizontal directions.
Figure 5B:
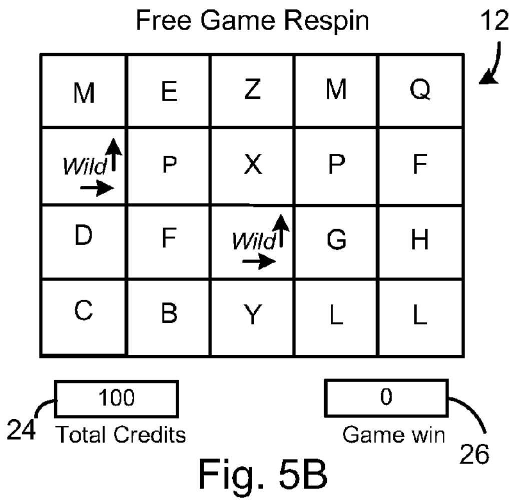
FIG. 5B illustrates the screen display after a first respin pursuant to the wild symbols in FIG. 5A.

During the 10 free games in the bonus round, the wild symbols may be enhanced, such as by causing the respinning reels in both the vertical and horizontal directions, as shown in FIGS. 5A and 5B. The reels strips may be changed to show vertical and horizontal arrows as part of the wild symbol. FIG. 5A displays the symbol results after the first spin in a free game. Two wild symbols have been displayed. After any award has been paid, the reels in the designated vertical columns and horizontal rows are respun, while the remaining reels and the wild symbols are held. FIG. 5B is an example of the results of the respin.

In one embodiment, the wild symbols are also respun, so every reel in a column or row is respun as a result of a wild symbol in that column or row.

Figure 6:
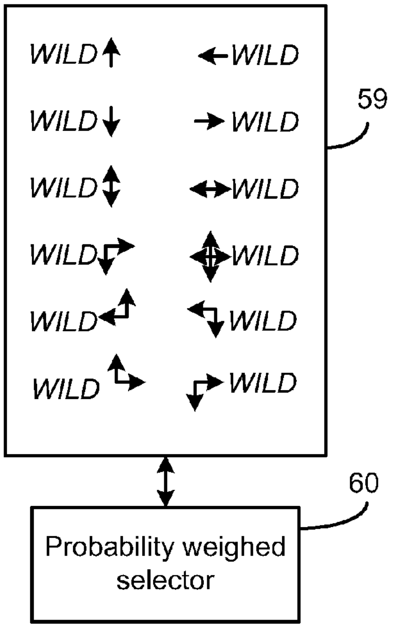
FIG. 6 illustrates that the direction associated with a wild symbol may be pseudo-randomly selected, rather than being predetermined.

FIG. 6 illustrates that the directions associated with a wild symbol may be pseudo-randomly selected before a direction is applied to respin reels. All wild symbol possibilities are stored in a memory 59, and a probability weighted selector 60 may select any one of the wild symbols for the displayed wild symbol. The system may be configured so that a multi-directional wild symbol has less chance of being selected than a single-direction wild symbol.

There may be variations on the above examples where one or more directions associated with special symbols (e.g., wild symbols) cause the respinning of reels in the designated direction(s).

In one embodiment, the free games are played with the same bet and number of activated paylines that applied to the paid game that resulted in the bonus round trigger. The amount of the bet determines the award for each winning combination.

Although, in the examples, the directional symbol is a wild symbol that represents all symbols (except a scatter function), the directional symbol can instead be any other symbol.

In another embodiment, an award multiplier increases for each respin (e.g., initial spin=1×; first respin=2×; second respin=3× or 4×; etc.). This is more practical when the directional wild symbols are only available for display during special bonus games so that the overall pay-in/payout ratio is not significantly affected.

In another embodiment, the number of consecutive respins for a single paid wager can be tallied and, if the tally reaches a predetermined number, the player wins a special bonus award (e.g., credits, free games, etc.).

Although a stand-alone gaming machine has been described, the term "gaming machine" may also apply to a programmed home computer, or any other type of computer, including a cell phone, programmed to carry out the present bonus game.

The term "random" used herein refers to pure random as well as pseudo-random.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention. For example, the bonus trigger may be any symbols combination and only award one free game. Any of the features described herein may be combined into a game.

What is claimed is:

1. A method performed by a video gaming device, the method comprising:

a. spinning and stopping an M×N array of virtual reels in an initial game, where M and N are each greater than one, each virtual reel, when stopped, displaying a symbol to generate an M×N array of symbols, the symbols on the virtual reels including a plurality of directional wild symbols, each directional wild symbol representing a plurality of other symbols for use in making symbol combinations, each directional wild symbol being associated with at least one direction, wherein at least one of the directional wild symbols is associated with at least a vertical direction, wherein at least one of the directional wild symbols is associated with at least a horizontal direction, and wherein an appearance of a directional wild symbol in an array of symbols associated with at least the vertical direction causes one or more additional reels along at least the vertical direction to be independently respun to give a player an additional chance to win, and wherein an appearance of a directional wild symbol in an array of symbols associated with at least the horizontal direction causes one or more additional reels along at least the horizontal direction to be independently respun to give the player an additional chance to win;

b. when a directional wild symbol appears in the array of symbols in the initial game, then causing the one or more additional reels along the at least one direction associated with that directional wild symbol to be respun and randomly stopped to create new symbol combinations in the M×N array in a respin game;

c. when a new directional wild symbol appears in the array of symbols in the respin game, then causing one or more reels along the at least one direction associated with that new directional wild symbol to be respun and randomly stopped to create new symbol combinations in the M×N array in a second respin game;

d. repeating step c for subsequent respin games whenever a new directional wild symbol appears after a respin of the reels, and terminating respin games when no new directional wild symbols appear after a respin of the reels; and e. paying an award to a player for any winning combination of symbols in the M×N array at least after all respin games have been played.

2. The method of claim 1 wherein step e comprises paying an award to a player for any new winning combination of symbols in the M×N array after each respin game.

3. The method of claim 1 wherein step e comprises paying an award to a player for any winning combination of symbols in the M×N array after the initial game.

4. The method of claim 1 wherein step e comprises only paying an award to a player for any winning combination of symbols in the M×N array after a final respin game when no new directional wild symbols have been displayed.

5. The method of claim 1 wherein the at least one direction changes after each spin of the reels.

6. The method of claim 1 wherein each directional wild symbol is only associated with one direction for a particular spin of the virtual reels.

7. The method of claim 1 wherein each directional wild symbol is associated with at least two directions for a particular spin of the virtual reels.

8. The method of claim 1 wherein at least one of the directional wild symbols is only associated with one direction for a particular spin of the virtual reels and only associated with another direction for a subsequent respin of the virtual reels.

9. The method of claim 1 wherein a direction associated with a directional wild symbol is randomly determined.

10. The method of claim 1 wherein directional wild symbols that appear in the array of virtual reels prior to a respin are held during the respin.

11. The method of claim 1 further comprising wagering a first amount on the initial game, wherein an award for any winning combination of symbols obtained during any respin is based on the first amount.

12. The method of claim 1 wherein at least some symbols on the virtual reels are special symbols, wherein certain combinations of the special symbols award the player a number of free games.

13. The method of claim 12 wherein the special symbols are held during any respins of the reels.

14. The method of claim 1 wherein the directional wild symbols are only displayed on the virtual reels during free bonus games.

15. A video gaming machine comprising:

a display; and a programmed processor, the processor programmed for carrying out the following method:

a. spinning and stopping an M×N array of virtual reels, where M and N are each greater than one, displayed on the display, in an initial game, each virtual reel, when stopped, displaying a symbol to generate an M×N array of symbols, the symbols on the virtual reels including a plurality of directional wild symbols, each directional wild symbol representing a plurality of other symbols for use in making symbol combinations, each directional wild symbol being associated with at least one direction, wherein at least one of the directional wild symbols is associated with at least a vertical direction, wherein at least one of the directional wild symbols is associated with at least a horizontal direction, and wherein an appearance of a directional wild symbol in an array of symbols associated with at least the vertical direction causes one or more additional reels along at least the vertical direction to be independently respun to give a player an additional chance to win, and wherein an appearance of a directional wild symbol in an array of symbols associated with at least the horizontal direction causes one or more additional reels along at least the horizontal direction to be independently respun to give the player an additional chance to win;

b. when a directional wild symbol appears in the array of symbols in the initial game, then causing the one or more additional reels along the at least one direction associated with that directional wild symbol to be respun and randomly stopped to create new symbol combinations in the M×N array in a respin game;

c. when a new directional wild symbol appears in the array of symbols in the respin game, then causing one or more reels along the at least one direction associated with that new directional wild symbol to be respun and randomly stopped to create new symbol combinations in the M×N array in a second respin game;

d. repeating step c for subsequent respin games whenever a new directional wild symbol appears after a respin of the reels, and terminating respin games when no new directional wild symbols appear after a respin of the reels; and e. paying an award to a player for any winning combination of symbols in the M×N array at least after all respin games have been played.

16. The machine of claim 15 wherein step e comprises paying an award to a player for any new winning combination of symbols in the M×N array after each respin game.

17. The machine of claim 15 wherein step e comprises paying an award to a player for any winning combination of symbols in the M×N array after the initial game.

18. The machine of claim 15 wherein step e comprises only paying an award to a player for any winning combination of symbols in the M×N array after a final respin game when no new directional wild symbols have been displayed.

19. The machine of claim 15 wherein the at least one direction changes after each spin of the reels.

20. The machine of claim 15 wherein directional wild symbols that appeared in the array of virtual reels prior to a respin are held during the respin.

21. The machine of claim 15 wherein the video gaming machine comprises a computing device connected to the internet.

22. The method of claim 1 wherein the video gaming device comprises a computing device connected to the internet.

* * * * *